Oct. 27, 1931.  A. T. SMITH  1,828,822
COIL WINDING MACHINE
Filed Oct. 5, 1929  3 Sheets-Sheet 2

INVENTOR
Aurile T. Smith
BY
Rector, Hibben, Davis, & Macauley
ATTORNEYS

Oct. 27, 1931.  A. T. SMITH  1,828,822
COIL WINDING MACHINE
Filed Oct. 5, 1929  3 Sheets-Sheet 3
Fig. 3.
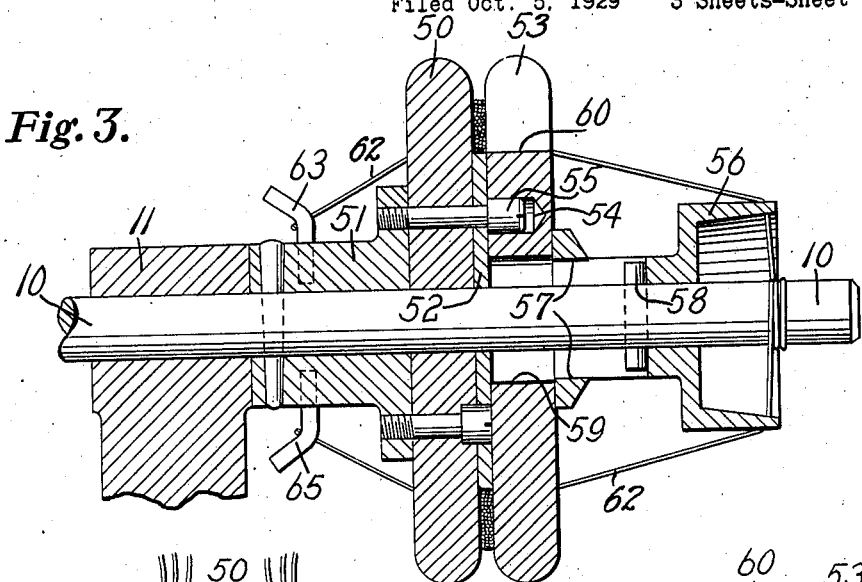
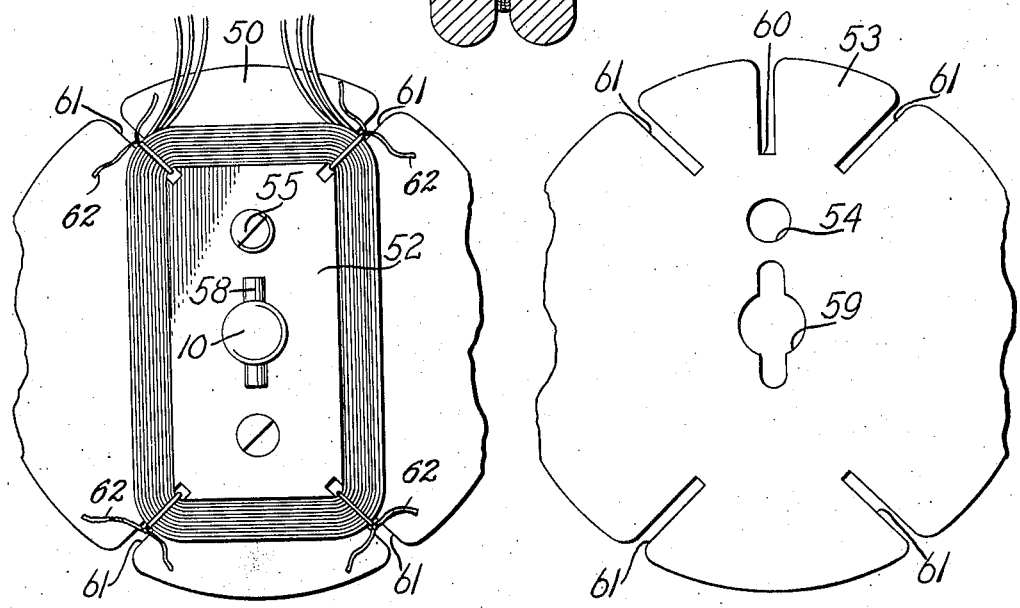
Fig. 4.  Fig. 5.
INVENTOR
Aurile T. Smith
BY
Rector, Hibben, Davis & Macauley
ATTORNEYS Patented Oct. 27, 1931

1,828,822

UNITED STATES PATENT OFFICE

AURILE T. SMITH, OF DETROIT, MICHIGAN, ASSIGNOR TO BURROUGHS ADDING MACHINE COMPANY, OF DETROIT, MICHIGAN, A CORPORATION OF MICHIGAN

COIL WINDING MACHINE

Application filed October 5, 1929. Serial No. 397,579.

This invention relates to a coil winding machine.

It is necessary, when winding electrical coils for armatures and the like, to have an exact number of turns in the coils because a greater or lesser number will change the magnetic or electrical effect of the coils when placed in the apparatus with which they are designed to operate. In many cases the winding of the correct number of turns is left to the skill of the operator with the result that there is often a considerable variation in the number of turns per coil. The present invention contemplates taking the question of how many turns shall be wound in the coil out of the hands of the operator and making it impossible for him to wind anything except the correct number of turns.

The general object of the invention is to provide an improved coil winding machine.

A more particular object is to provide a coil winding machine that will automatically stop when the coil has been wound with a predetermined number of turns.

Other objects and advantages of the invention will appear from the specification and drawings.

An embodiment of the invention is shown in the accompanying drawings in which:—

Fig. 3 is a sectional front elevation on the line 3—3 of Fig. 2 showing a coil completely wound on the forming spool;

Fig. 4 is a right side elevation of the forming spool with the outer guide member removed after a coil has been completely wound and tied;

Fig. 5 is a right side elevation of the outer guide disk of the forming spool.

Figure 1:
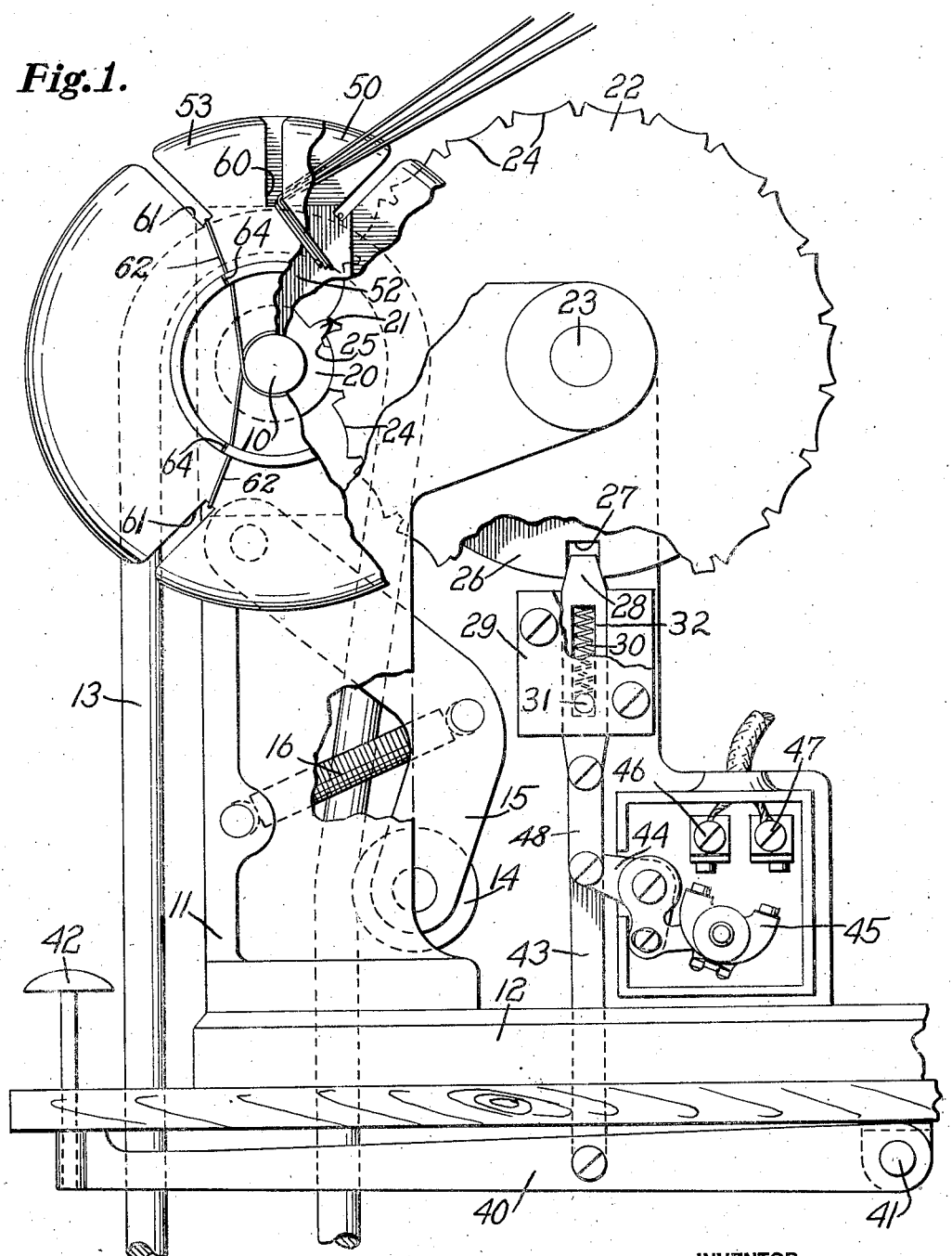
Figure 1 is a right side elevation of the coil winding machine with some of the parts cut away to show others more clearly, the parts being shown in normal starting position with a wire applied preparatory to winding a coil.

The coils are wound on a spool fixed to the shaft 10 shown in Fig. 1, which is journaled in frame plates 11 carried by a base 12. The details of this spool will be described later, it being sufficient for the present to know that the spool rotates with the shaft 10 and that every time the shaft revolves one revolution one turn of wire is wound on the coil being formed. The shaft 10 is driven by an electric motor (not shown) that drives a belt 13 passing over a pulley fixed to the shaft 10. The tension of the belt is maintained by an idler pulley 14 carried by a pair of pivoted arms 15 urged to the left as viewed in Fig. 1 by a spring 16.

In order to automatically control the number of turns wound on each coil a construction is provided that includes a gear 20 fixed to the shaft 10 and provided with a single tooth 21 (Fig. 1). This tooth meshes with the teeth of a special governing gear 22 carried by a shaft 23 journaled in the extensions of the frame members 11. It will be clear, by reference to Fig. 1, that each time the shaft 10 revolves one revolution the tooth 21 will advance the gear 22 one step. The length of this step will depend upon the number of teeth in the gear 22. In the example illustrated, the gear is provided with twenty-two teeth which means that the shaft 10 will have to revolve twenty-two times before the gear 22 is revolved one revolution. The top of the teeth in the gear 22 have concave faces 24 the curvatures of which correspond to the curvature of the gear 20 so that, while the shaft 10 is rotating with the tooth 21 out of contact with the gear 22, the gear 22 is locked against movement by the smooth periphery of the gear 20 which is moving along the concave top face of one of the teeth in gear 22. In order that the gears may clear one another when the tooth 21 comes around, the gear 20 is cut out at 25 to accommodate the ends of the teeth in the gear 22.

Fixed to the shaft 23 to rotate with the gear 22 is a locking disk 26 having a smooth periphery except for one notch 27 that is adapted to receive a tapered locking dog 28 slidably mounted in a guide plate 29 and urged upward to locking position by a spring 30 that bears against a stud 31 extending from the plate 29 through a slot 32 in the dog 28. In the normal position of the parts illustrated in Fig 1 the dog 28 is in locking position and hence the shaft 10 with its winding spool cannot be rotated.

Controlling means is provided for unlocking the machine and starting the motor, this means being best illustrated in Fig. 1. A control lever 40 is pivoted at 41 to a portion of the machine base 12, the opposite end of the lever carrying a push button 42. Connected to the lever intermediate its ends is a link 43 whose upper end is pivoted to a bell crank lever 44 that controls the switch for starting the motor. This bell crank lever carries a movable switch contact 45 adapted to bridge the stationary contacts 46 and 47 in the motor circuit. When the push button 42 is depressed the lever 40 moves counterclockwise pulling down on the link 43 which rocks the bell crank lever 44 counterclockwise and closes the switch to start the motor.

A connection is also provided between the locking dog and the control lever this connection consisting of a link 48 one end of which is attached to a locking dog 28 and the other end to the bell crank lever 44 at the point where it is attached to the link 43. As will be clear by reference to Fig. 1, when the lever 40 is moved downward to close the switch, the locking dog 28 is pulled down against the tension of spring 30 to release the locking disk 26. The spring 30 not only acts to urge the locking dog 28 to locking position, but it also urges the motor switch to open position and the lever 40 to its normal position illustrated in Fig. 1.

As the control lever is depressed it releases the locking disk 26 and starts the motor which rotates the shaft 10 and its gear 20 counterclockwise. The gear 22 is advanced a step which moves the locking plate 26 so that the slot 27 does not register with the locking dog 28. This locking dog then rides on the periphery of the locking disk 26 under the tension of the spring 30. It continues to ride on the periphery of the locking disk until the slot 27 again registers with the locking dog which requires a full revolution of the locking disk.

From the description thus far given it will be clear that the winding machine is normally locked against movement which means that the winding spool is held rigid while the wire is being attached to it. Also, the operator cannot move the winding spool by hand unless he unlocks the machine and in unlocking the machine he will start the motor which will continue driving the machine until the winding shaft 10 with its spool has been rotated a predetermined number of revolutions. In other words, after the winding of a coil has been started the machine cannot be stopped until the proper number of turns has been wound which means that the winding of the coil cannot be arrested short of the proper number of turns. After a coil has been wound with a given number of turns the motor circuit is broken and the machine is automatically stopped and locked in position which prevents the operator from moving the winding shaft by hand to add more turns to the coil. The machine is entirely automatic and positive in that it insures that only the exact number of turns required will be wound upon the coil and this number will be positively wound if the machine is once started to winding.

The winding spool, which is best illustrated in Fig. 3, comprises a circular guide disk 50 attached to a sleeve 51 that is fixed to the shaft 10. Attached to this disk is a central plate 52 whose edge is shaped to conform to the interior of the coil that is to be wound. In the example shown this is rectangular as illustrated in Fig. 4. A second guide disk 53 similar to the disk 50 fits against the central portion 52 being located by means of a hole 54 in the disk (Fig. 5) that fits over the head 55 of one of the bolts that holds the parts 50 and 51 together. The removable disk 53 is held in position by a locking sleeve 56 having a double bayonet slot 57 (Fig. 2) cooperating with a pin 58 in the shaft 10. The disk 53 has a suitable opening 59 (Fig. 5) that permits it to be removed over the end of the shaft 10 and over the ends of the pin 58.

The edges of the disks 50 and 53 are rounded as illustrated in Fig. 3 so that the wire that is being wound will move between the disks easily. The disk 53 has a slot 60 in which the wire is started and each of the disks 50 and 53 has four slots 61 that are for the reception of the tying cords used to tie the coil together after it is wound.

Figure 2:
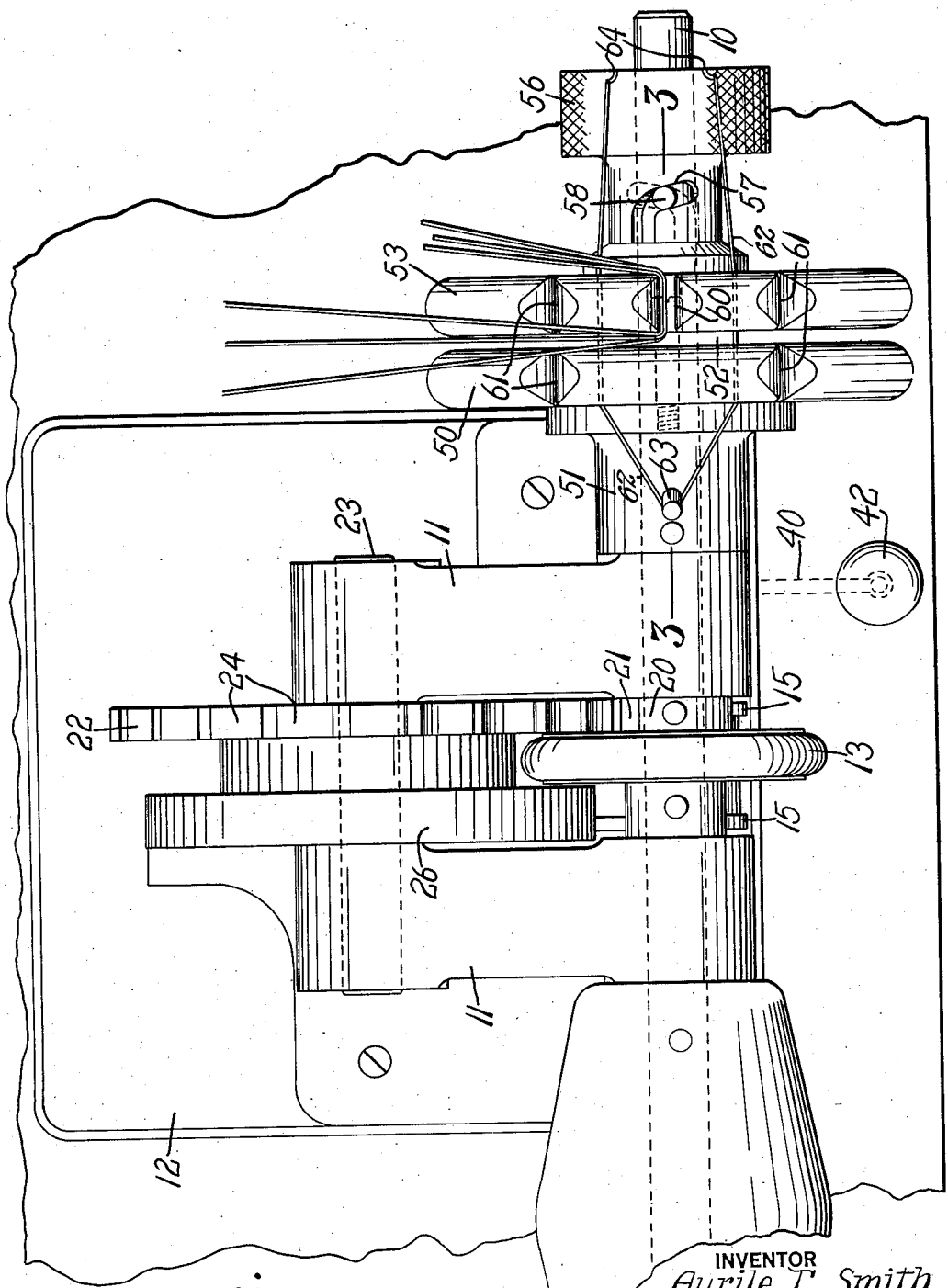
Fig. 2 is a plan view of the machine with the parts in the same condition as Fig. 1.

In winding a coil the tie cord 62 is first placed in position. This cord is looped and the loop is hooked over a pin 63 fixed to the hub 51. The ends of the cord are then passed through the two top slots 61 in disks 50 and 53 and through curved slots 64 in the top edge of the sleeve 56 (Fig. 2). Each end of the cord is next given a turn about the shaft 10 and passed through curved slots in the bottom edge of the sleeve 56 after which it is passed through the lower slots 61 in the disks 50 and 53 and then hooked over a pin 65 fixed to the hub 51, the ends being returned through one of the slots 61 to hold them in position. The wire that is to be wound into a coil is then placed in the slot 60 and bent as illustrated in Fig. 2, leaving sufficient free wire for the coil connections. In the example shown, three strands are wound at a time and all three wires are placed in the slot. After this is done the operator depresses the knob 42 whereupon the machine starts to operate and it automatically winds a predetermined number of turns on the coil after which the machine is automatically stopped and locked. The operator then cuts the tie cord on both sides of the winding spool. One of the top tie cords is then tied in position as illustrated in Fig. 4 to keep the coil from unwinding after which the coil wire is cut sufficiently back of the coil to provide the necessary coil connections. The other top tie cord is then tied after which the winding spool can be rotated by hand to bring the other two slots 61 on top so that the bottom tie cords can be tied. This partial rotation of the spool is limited by the striking of the tooth 21 against the gear 22 which is locked. After the tie cords have been tied the locking sleeve 56 is removed after which the plate 53 is also removed whereupon the wound coil can be taken off the spool.

While the construction shown is the preferred one, it is to be understood that variations can be made in it without departing from the spirit and scope of the invention as defined by the appended claims.

I claim:

1. A coil winding machine having a rotatable spool upon which a coil may be wound, locking means normally preventing rotation of said spool, means for rotating the spool, and controlling means acting when manipulated to unlock the locking means and set said rotating means into operation, said locking means acting automatically to stop and lock said spool after a given number of turns of wire have been wound thereon.

2. A coil winding machine having a rotatable spool upon which a coil may be wound, a locking means normally locking said spool against rotation, an operating means for rotating the spool, and controlling means for unlocking the locking means and causing the operating means to rotate said spool, said controlling means being driven by said spool as it rotates and acting automatically to stop rotation of the spool and lock it after said spool has rotated a predetermined number of revolutions.

3. A coil winding machine having a spool upon which a coil may be wound, a one-tooth gear rotatable with said spool, a governing gear advanced step by step by said one-tooth gear, a locking plate movable with said governing gear, said locking plate having a notch in its periphery, and a locking dog normally engaging said notch to lock said machine against rotation, said dog traveling on the periphery of said plate while said governing gear is being rotated and automatically entering said notch to stop rotation of the machine after the spool has revolved a predetermined number of revolutions.

4. A coil winding machine having a rotatable spool upon which a coil may be wound, an electric driving means for rotating said spool, a switch for controlling said driving means, a one-tooth gear rotatable with said spool, a governing gear driven step by step by said one-tooth gear, a locking plate rotatable with said governing gear, said locking plate having a notched periphery, a locking dog normally engaging said notch, and controlling means for disengaging said dog from said notch and for closing said motor switch, said dog traveling on the periphery of said lock plate as the plate is rotated and being urged in a direction to automatically enter said notch after said plate has revolved one revolution to thereby stop and lock the plate in position and open the switch.

5. A coil winding machine having a spool upon which a coil may be wound, a one-tooth gear rotatable with said spool, a governing gear moved step by step by said one-tooth gear, said gears having cooperating surfaces for locking the governing gear against rotation until the single tooth of the one-tooth gear engages the governing gear, and means for automatically stopping said governing gear after the same has been moved one revolution.

6. A coil winding machine having a rotatable spool upon which a coil may be wound, a one-tooth gear rotatable with said spool, a governing gear moved step by step by said one-tooth gear, locking means normally locking said governing gear against rotation, and controlling means for unlocking said locking means, said locking means acting automatically after a predetermined number of turns have been wound on a coil to stop said governing gear and said spool.

7. A coil winding machine having a rotatable spool upon which the coil may be wound, means for rotating said spool, a one-tooth gear rotatable with said spool, a governing gear moved step by step by said one-tooth gear, a locking means normally locking said governing gear against rotation, and controlling means for unlocking the locking means and setting the rotating means into operation, said locking means acting automatically after a predetermined number of turns have been wound on a coil to stop the rotating means and lock the governing gear against rotation.

In testimony whereof, I have subscribed my name.

AURILE T. SMITH.